March 1, 1927.
C. H. VOELLMECKE
PIPE HANGER
Filed March 5, 1925
1,619,591
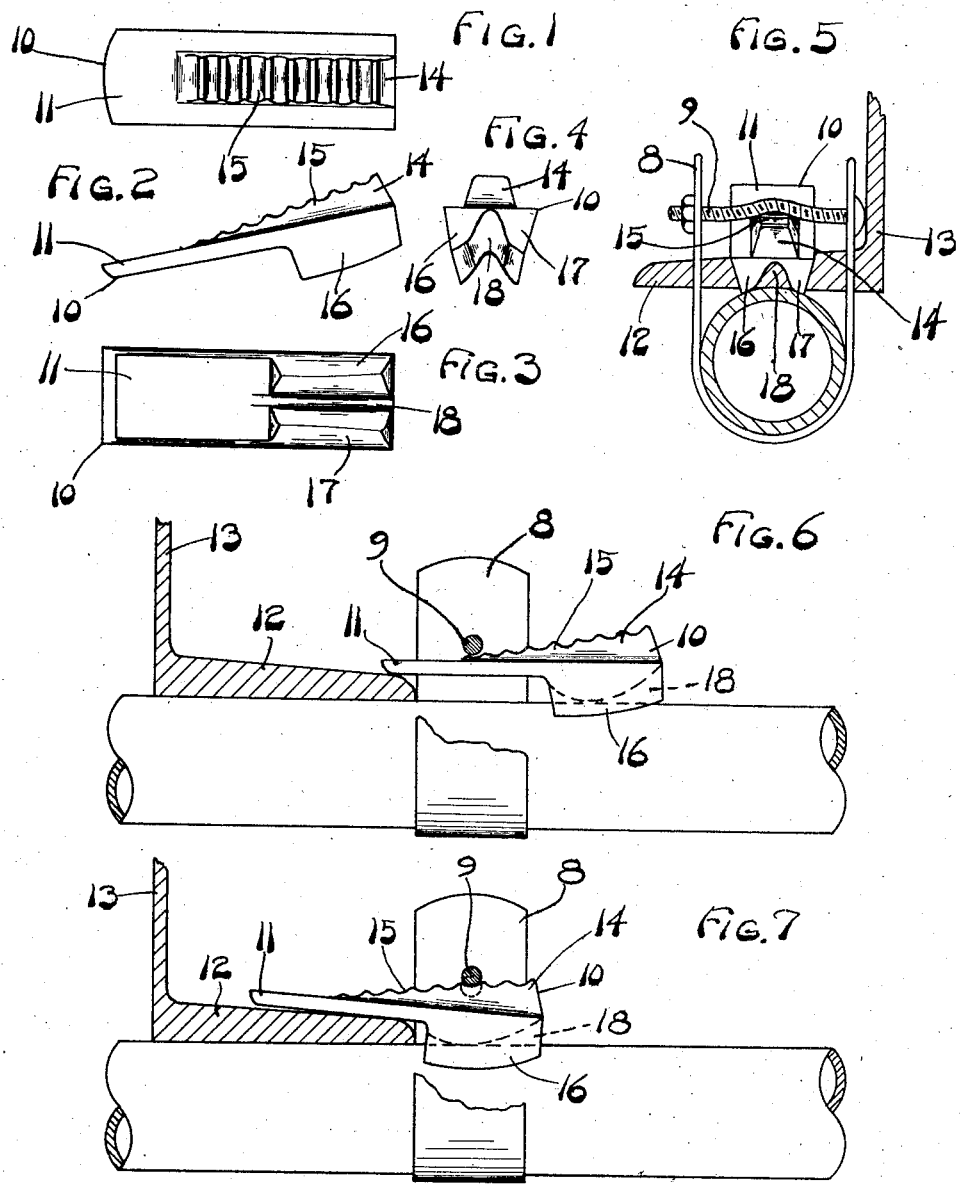

Patented Mar. 1, 1927.

1,619,591

UNITED STATES PATENT OFFICE.

CARL H. VOELLMECKE, OF CINCINNATI, OHIO.

PIPE HANGER.

Application filed March 5, 1925. Serial No. 13,158.

The invention herein described has for an object to produce a pipe hanger of extreme simplicity and efficiency, which is cheap to produce, with the least possible weight to be carried in quantities by the overhead pipe hanger workman and which is strong and quickly and easily applied.

A further object of this invention is to produce an improved pipe hanger in which pipes, electric conduits, rods, and the like may be quickly, securely and with little labor be fastened unto structural iron and steel members, such as I beams, channels, etc.

These and other objects are attained in the pipe hanger described, which were not attainable in my former patent numbered 1,474,059, of date Nov. 13, 1923, and which improvements are described in the following specification and illustrated in the accompanying drawing, in which:

Fig. 1 is a plan view of the locking wedge embodying the principal feature of novelty of my invention.

Fig. 2 is a side elevation of the wedge shown in Fig. 1.

Fig. 3 is an inverted plan view of the wedge shown in Figs. 1 and 2.

Fig. 4 is a rear end elevation of the wedge shown in Figs. 1, 2 and 3.

Fig. 5 is an end elevation of the hanger as applied to a pipe and supporting element.

Fig. 6 is a side elevation of my hanger on a pipe and in the position and condition its parts assume previous to placing them in locked position and condition.

Fig. 7 is a view similar to Fig. 6, but showing the parts in the positions and conditions taken by them when the pipe is in locked supported position.

My improved pipe hanger consists of but three elements. A strap 8 surrounds the pipe and is provided with a bolt 9 between its upwardly extending ends. Between the bolt and the pipe a locking wedge 10 is adapted to be passed. This locking wedge has a lip 11 which is adapted to be driven into engagement with the flange 12 of a supporting element such as a channel iron 13, after it has been passed beneath the bolt 9. The upper surface of the wedge is provided with a relatively narrow portion 14 which has notches 15 therein for engagement with the bolt at a point between its strap supported ends as shown in Fig. 5. The rear end of the wedge is provided with two pipe straddling lugs 16 and 17, between which is a notch 18. The sides of this notch are curved so as to permit the wedge to be rocked as it is driven into place as shown in Figs. 6 and 7.

The operation of the hanger is simple. The strap 8 is passed around the pipe and is provided with the bolt 9 between its ends as shown in Fig. 5. The wedge 10 is then placed in the position shown in Fig. 6 and is driven into the wedging position shown in Fig. 7. This causes the narrow wedge portion 14 to bend the bolt 9 at its center until it assumes the bent shape shown in Fig. 5 and in section in Fig. 7. The notches, during this wedging movement, ride, one after the other over the bolt until the wedge is tight enough. In this condition the wedge will be locked against displacement from pipe supporting position by reason of the spring like tension created by the bent bolt. Thus it will be seen that the bending of the bolt through and created by the rocking motion of the body of the wedge portion when driven forward and up the incline of the supporting element, is an important feature of the invention more especially since the toe of the supporting element in construction work varies in thickness. Thus the wedge portion being rounded under its front engaging surface will by reason of the rocking portion of the under body of the wedge portion, by being driven forward, inclines itself to accommodate varying thicknesses of the supporting element, while the bolt element being the weakest begins to bend upward but without shearing itself.

Having thus described my invention what I claim is:—

A pipe hanger comprising a strap adapted in substantial U shape to embrace a pipe to be supported, a bendable bolt passing through and extending between the branches of the strap, and a wedge adapted to be passed between the ends of the strap and between the bolt and the pipe to be supported, said wedge being of less width than the distance between the branches of the strap and having a lip for engaging a supporting member, the body of the wedge consisting of two lugs on its under side adapted to engage the surface of the pipe to be supported, and a notched upper surface for engagement with the bendable bolt, said pipe engaging lugs being curved to permit the wedge to be rocked as its lip is driven into supporting engagement with the supporting member, whereby the notch occupied by the bolt will simultaneously effect a bending spring-like action of the bolt and a consequent gripping of the wedge in adjusted position.

In witness whereof, I affix my signature.

CARL H. VOELLMECKE.